United States Patent
Senba et al.

(10) Patent No.: US 7,427,420 B2
(45) Date of Patent: Sep. 23, 2008

(54) PROCESS FOR PRODUCING CONFECTIONERY HIGHLY STABLE TO HEAT

(75) Inventors: Katunori Senba, Tsukuba-gun (JP); Koji Umeno, Tsukuba-gun (JP); Yoshio Yamawaki, Tsukuba-gun (JP)

(73) Assignee: Fuji Oil Company, Limited, Osaka (JP)

( * ) Notice: Subject to any disclaimer, the term of this patent is extended or adjusted under 35 U.S.C. 154(b) by 194 days.

(21) Appl. No.: 10/220,729

(22) PCT Filed: Feb. 28, 2001

(86) PCT No.: PCT/JP01/01545

§ 371 (c)(1),
(2), (4) Date: Sep. 4, 2002

(87) PCT Pub. No.: WO01/65947

PCT Pub. Date: Sep. 13, 2001

(65) Prior Publication Data

US 2003/0031762 A1 Feb. 13, 2003

(30) Foreign Application Priority Data

Mar. 7, 2000 (JP) ............................. 2000-061400
May 30, 2000 (JP) ............................. 2000-159970

(51) Int. Cl.
*A23P 1/08* (2006.01)
(52) U.S. Cl. ...................... 426/306; 426/631
(58) Field of Classification Search .................. 426/93, 426/94, 98, 303, 306, 307, 309, 496, 506, 426/507, 549, 552, 553, 631, 659
See application file for complete search history.

(56) References Cited

U.S. PATENT DOCUMENTS

| | | | | |
|---|---|---|---|---|
| 2,480,935 | A | * | 9/1949 | Kempf et al. ............... 426/660 |
| 3,784,713 | A | * | 1/1974 | Colton ...................... 426/658 |
| 4,563,363 | A | * | 1/1986 | Yoon ....................... 426/303 |
| 4,812,318 | A | * | 3/1989 | Finkel ...................... 426/94 |
| 4,961,941 | A | * | 10/1990 | Cocco et al. ............... 426/94 |
| 4,961,942 | A | * | 10/1990 | Cocco et al. ............... 426/94 |
| 5,108,769 | A | * | 4/1992 | Kincs ....................... 426/93 |
| 5,149,560 | A | * | 9/1992 | Kealey et al. .............. 426/602 |
| 5,271,950 | A | | 12/1993 | Yamaguchi |
| 5,378,481 | A | * | 1/1995 | Minamikawa et al. ........ 426/99 |
| 5,424,085 | A | * | 6/1995 | Hsieh et al. ............... 426/289 |
| 5,595,780 | A | * | 1/1997 | Zook ....................... 426/632 |
| 5,657,687 | A | | 8/1997 | Callebaut |
| 6,054,166 | A | | 4/2000 | Dupart |
| 6,165,540 | A | | 12/2000 | Traitler et al. |
| 6,395,316 | B1 | | 5/2002 | Leas |

FOREIGN PATENT DOCUMENTS

| | | |
|---|---|---|
| CN | 1036565 C | 12/1997 |
| JP | 62-87049 | 4/1987 |
| JP | 3-139241 | 6/1991 |
| TW | 43050 | 4/1982 |
| TW | 127292 | 1/1990 |
| TW | 168601 | 9/1991 |
| TW | 175299 | 12/1991 |
| TW | 198678 | 1/1993 |
| TW | 321591 | 12/1997 |
| TW | 370452 | 9/1999 |
| TW | 393302 | 6/2000 |
| TW | 423959 | 3/2001 |
| WO | 00/19824 | 4/2000 |

OTHER PUBLICATIONS

Potter, Norman, 1973. Food Science, 2nd edition, The AVI Publishing Company, Inc. Westport, Ct, p. 556.*
Minifie, B. W. 1980. Chocolate, Cocoa and Confectionery: Science and Technology, 2nd edition. AVI Publishing Company, In Westport, CT. 315.*
Desrosier, N. W. 1977. Elements of Food Technology, AVI Publishing Co., INC, Westport, CT, p. 24-25.*
Anon. 1982. The American Heritage Dictionary. Houghton Mifflin Co. p. 307.*
Kim, S. S. et al. 1999. Moisture Sorption Characteristics of Composite Foods Filled with Chocolate. J. of Food Science 64(2)300.*
Mable Hoffman, "Chocolate Cookery", Fisher Publishing Inc., Tucson, Arizona, pp. 167-169, 176-179, 1978.

* cited by examiner

*Primary Examiner*—Carolyn Paden
(74) *Attorney, Agent, or Firm*—Wenderoth, Lind & Ponack, L.L.P.

(57) ABSTRACT

The present invention provides a process for producing confectionery highly stable to heat which can be eaten without being deformed, becoming sticky at the surface or sticking to each other while maintaining the original mouthfeel of chocolate. As a result of the present inventors' intensive studied, it has been found out that a process for producing confectionery highly stable to heat can be provided by making the surface of a refined chocolate paste absorb moisture or bringing chocolate into contact with a moisture-containing food material, and then baking.

4 Claims, No Drawings

PROCESS FOR PRODUCING CONFECTIONERY HIGHLY STABLE TO HEAT

TECHNICAL FIELD

The present invention relates to a process for producing confectionery whose heat stability is significantly improved not by adjusting the melting point of a fat ingredient, but by making the surface of a refined chocolate paste absorb moisture, or bringing chocolate into contact with a moisture-containing food material, and then baking.

BACKGROUND ART

Until now, heat stability of goods produced by combining edible materials such as baking confectionery, candies, nuts, snack confectionery and the like with chocolate is limited by the melting point of the chocolate, and there are problems due to melting of a fat ingredient such as deformation, stickiness at the surface, sticking to each other, and the like, which results in loss of commercial value. Then, various methods for improving heat stability of chocolate have been studied. For example, a fat ingredient having a higher melting point is used. JP 55-9174 B discloses a process for producing confectionery, wherein an oily confectionery dough or paste such as a refined chocolate paste is heated to 80° C. or higher and then solidified to obtain confectionery highly stable to heat which can be eaten without stickiness, deformation and making hands and fingers dirty even when allowing it to stand at a temperature higher than its melting point. Further, JP 10-210934 A proposes a process for producing baked confectionery which comprises incorporating air cells into a refined chocolate paste, and molding, baking and solidifying the resultant paste.

However, these known methods have some problems. When a fat ingredient having a higher melting point is used, meltability in the mouth of the resultant product is deteriorated. Further, confectionery such as chocolate, etc. obtained by heating and solidifying according to the method disclosed in JP 55-9174 B, etc. becomes hard and has crumbling mouthfeel due to heating at 80° C. or higher. Furthermore, chocolate obtained according to the method proposed by JP 10-210934 A contains air cells and its mouthfeel therefore is different from the original mouthfeel of the chocolate.

DISCLOSURE OF THE INVENTION

An object of the present invention is to provide a process for producing confectionery highly stable to heat which can be eaten without being deformed, becoming sticky at the surface, or sticking to each other while maintaining the original mouthfeel of chocolate.

The present inventors have studied intensively so as to solve the above problems. As a result, it has been found out that a process for producing confectionery highly stable to heat can be provided by making the surface of a refined chocolate paste absorb moisture or bringing chocolate into contact with a moisture-containing food material, and then baking the resultant material.

BEST MODE FOR CARRYING OUT THE INVENTION

In the present invention, as chocolate, chocolate pastes such as a refined chocolate paste, a refined white chocolate paste, etc. (i.e., regardless of the amount of cocoa butter and the presence or absence of cocoa ingredients) can be used. Further, a dough or paste obtained by mixing a saccharide ingredient with a fat ingredient such as a nut cream paste, an oily topping paste, etc. can also be used. For example, there can be used a product prepared by adding a saccharide ingredient and, if necessary, one or more ingredients such as taste ingredients, for example, nut paste, nut powder, whole milk powder, skimmed milk powder, starch, cheese powder, curry powder, powdered fruit juice, instant coffee, etc.; emulsifier; flavor; colorant; and the like to a fat ingredient.

So-called hard butter including a tempering type fat ingredient such as cocoa butter, a cocoa butter substitute, etc., or a non-tempering type fat ingredient such as trans type hard butter whose constituent fatty acids include elaidic acid can be used as a fat ingredient to be used for the chocolate of the present invention. Other fats and oils which have been processed by hydrogenation, fractionation, interesterification and the like can also be used as a fat ingredient. Examples of a raw material include vegetable fats and oils such as rapeseed oil, soybean oil, sunflower seed oil, cottonseed oil, peanut oil, rice bran oil, corn oil, safflower oil, olive oil, kapok oil, sesame oil, evening primrose oil, palm oil, shea butter, sal fat, cocoa butter, coconut oil, palm kernel oil, etc.; animal fats and oils such as milk fat, beef fat, lard, fish oil, whale oil, etc.; as well as these fats and oils processed by hydrogenation, fractionation, interesterification, etc.

Preferably, the fat ingredient is a non-tempering type fat ingredient, otherwise chocolate causes fat bloom after baking. The fat ingredient to be used may be mainly composed of a non-tempering type fat ingredient, for example, trans type hard butter whose constituent fatty acids include elaidic acid, laurin type hard butter whose constituent fatty acids include lauric acid, or non-laurin hard butter whose main component is di-saturated mono-unsaturated glyceride (S2U).

Examples of the saccharide ingredient to be used for the chocolate of the present invention include mono-saccharides, oligo-saccharides, sugar alcohols, dextrin, starch syrup, and the like. As mono-saccharides, there are, for example, glucose, fructose, mannose and xylose. Normally, oligo-saccharides include di-saccharides to hexa-saccharides and specific examples thereof include sucrose, maltose, lactose, trehalose, maltotriose, and the like. Specific examples of sugar alcohols include sorbitol, maltitol, mannitol, erythritol, xylitol, oligo-saccharide alcohols, and the like. These saccharide ingredients can be used alone or in combination thereof. Sucrose, fructose, reducing lactose, oligo-saccharides, etc. are more suitable because they readily absorb moisture.

Preferably, a raw material which improves shape retention upon absorption of moisture such as dried egg white and/or a moisture-absorbing raw material is added to chocolate in an amount of 1 to 8%. Examples of dried egg white include commercially available powdered egg white. As a moisture-absorbing raw material, there are, for example, natural starches such as corn starch, potato starch, wheat starch, tapioca starch, etc.; modified starches such as α-starch, ether cross-linked starch, phosphate cross-linked starch, etc.; saccharides; etc.

Examples of confectionery to which chocolate adheres or which is covered with chocolate include baked confectionery such as biscuits, crackers, pies, puffs, wafers, etc; candies such as drops, nougats, jellies, etc.; nuts; breads; dried fruits; snack confectionery; and the like. Such confectionery may be that immediately after production or may be stored for a while after production. In some cases, baking of the confectionery may be completed upon baking together with chocolate.

In the present invention, examples of the moisture-containing food material include dough, raw seeds and nuts, and the like. As dough, there are, for example, dough of cookies, biscuits, crackers, pies, puffs, wafers, etc.

Examples of raw seeds and nuts include whole, or cracked or chopped peanuts, cashew nuts, almonds, pistachios, walnuts, hazel nuts, macadamia nuts, coconuts, etc., or ground pastes thereof. Preferably, the moisture-containing food material has a moisture content of 3 to 30% before baking. When the moisture content is less than 3%, chocolate is melted, flattened out and scorched during baking. When the moisture content exceeds 30%, a relatively larger amount of moisture is remained in the moisture-containing food material after baking and moisture migrates to chocolate, which results in deterioration of heat stability.

As the first process for producing confectionery of the present invention, chocolate can be melted, and either the melted chocolate is allowed to adhere to or cover the surface of the above confectionery and then solidified, or the melted chocolate is allowed to absorb moisture during solidification, followed by baking and cooling the resultant material to obtain the desired confectionery. It is preferred to make the melted chocolate absorb moisture during solidification because the surface of chocolate tends to be uniformly covered by moisture.

As a method for allowing chocolate to adhere to or cover the surface of confectionery, after melting chocolate, any of deposit method, coating method, etc. can be employed. For this operation, a manual operation can be employed, or a machine such as a coating machine, etc. can be used.

As a method for making the surface of chocolate absorb moisture, it is preferred to spray or apply water, a sugar solution, a solution of an emulsifier, etc. on or to the surface of chocolate, or to place chocolate in a moistening circumstance such as a steamer, etc. Preferably, these methods are used so that fine water droplets cover the surface of chocolate uniformly. When larger water drops partly cover the surface of chocolate, the surface becomes mottled upon baking, which results in inferior appearance.

Baking can be carried out by using, for example, an oven, a microwave oven, etc. It is sufficient to carry out baking in such a degree that only the surface of chocolate is solidified by heating to form, so to speak, thin skin or a film. When heating is effected so that the entire chocolate is solidified, the resultant product has scab-like bad appearance. In case of using an oven, normally, baking is carried out at 110 to 250° C. for several seconds to several tens minutes, and suitable baking temperature is 130 to 180° C. When baking temperature exceeds the above range, the surface becomes uneven and the surface is scorched. When baking temperature is lower than the above range, it takes much time until chocolate is provided with heat stability. This is inefficient.

As the second process for producing confectionery, chocolate is squeezed on a moisture-containing food material, or molded chocolate is deposited on a moisture-containing food, followed by baking. Moisture migrates from the moisture-containing food material to a chocolate paste and/or chocolate during this baking, thereby providing chocolate with heat stability as well as shape retention. Preferably, the molded chocolate is at least 3 mm thick and its viscosity after melted is at lowest 100 poise. When the thickness of chocolate is less than 3 mm, moisture is readily evaporated and chocolate is liable to be scorched. When viscosity of chocolate is lower than 100 poise, shape retention of chocolate during baking is deteriorated.

EXAMPLES

The following Examples further illustrate the present invention in detail but are not to be construed to limit the spirit of the present invention. In the Examples, all %s' and parts are by weight.

Viscosity of melted chocolate was measured by Tokyo Keiki BM viscometer with #4 rotor at 12 r.p.m.

Example 1

According to a conventional method, a refined chocolate paste was prepared by using cocoa mass (5 parts), cocoa powder (10 parts), whole milk powder (15 parts), sugar (35 parts), palm olein having the melting point of 35° C. (35 parts) and lecithin (0.4 part) and its temperature was adjusted to 40° C. A portion (2 g) of the paste was coated on the surface of a commercially available biscuit. Then, water was sprayed on the surface before solidification of the paste so that fine water droplets cover the surface, followed by baking with an oven at 150° C. for 4 minutes. After baking and cooling, the biscuit coated with the refined chocolate paste was obtained. When the taste of biscuit was evaluated, meltability in the mouth and mouthfeel were good. For evaluation of heat stability, the coated biscuit was allowed to stand in an incubator at 37° C. for 6 hours. However, no softening and melting of the surface of chocolate were observed and chocolate did not stick to hands and fingers.

Example 2

According to a conventional method, a refined white chocolate paste was prepared by using whole milk powder (20 parts), sugar (45 parts), cocoa butter (35 parts) and lecithin (0.4 part) and its temperature was adjusted to 40° C. A portion (3 g) of the paste was deposited on the surface of a commercially available wafer dough, followed by baking according to the same manner as described above. After baking and cooling, the wafer on which the refined white chocolate paste was deposited was obtained. When the taste was evaluated according to the same manner as in the above Example 1, meltability in the mouth and mouthfeel were good. In the same heat stability evaluation as in the above Example 1, no softening and melting of the surface of white chocolate were observed and white chocolate did not stick to hands and fingers.

Example 3

According to a conventional method, a cookie dough was prepared by using shortening (Panpas LB manufactured by Fuji Oil Company, Ltd.) (40 parts), sugar (30 parts), whole egg (10 parts), water (10 part), baking soda (0.3 part) and soft wheat flour (100 parts). The cookie dough was rolled into a sheet of 4 mm thick and a portion (3 g) of the refined chocolate paste of Example 1 which was adjusted to 40° C. was coated on the surface of the sheet molded into a 40 mm square. Then, a sucrose solution of 20 Brix was applied thereto and the resultant material was baked in an oven at 160° C. for 8 minutes. After baking and cooling, the cookie coated with the refined chocolate paste was prepared. When the taste was evaluated according to the same manner as in the above Example 1, meltability in the mouth and mouthfeel were good. In the same heat stability evaluation as in the above Example 1, no softening and melting of the surface of chocolate were observed and chocolate did not stick to hands and fingers.

Comparative Example 1

The refined chocolate paste of Example 1 was adjusted to 40° C. and its portion (2 g) was coated on the surface of a commercially available biscuit. The resultant material was baked without spraying water in an oven at 150° C. for 4 minutes. After baking, the surface of chocolate was partly scorched and film formation was insufficient, thereby failing to provide the product with heat stability at 37° C.

Example 4

Non-tempering type milk chocolate MSNYT (manufactured by Fuji Oil Company, Ltd.) was subjected to molding. The shape of mold used was length×width×height=20×20×10 mm. A cookie dough of 3 mm thick (molded frozen dough: water content of 15%) was cut into the shape of the bottom surface of the mold and the molded milk chocolate was placed thereon. It was baked in an over with the upper flame at 180° C. and the lower flame at 160° C. for 12 minutes. The resultant chocolate part had good gloss and excellent meltability in the mouth without crumbling mouthfeel. Its heat stability was in such a degree that, even when it was allowed to stand in an incubator at 37° C. for 6 hours, no softening and melting of the surface of chocolate were observed and chocolate did not stick to hands and fingers.

Comparative Example 2

Non-tempering type milk chocolate MSNYT (manufactured by Fuji Oil Company, Ltd.) was subjected to molding. This chocolate was baked without placing a cookie dough on the bottom surface. Since the molded chocolate did not have heat stability, it was melted and flattened out and also was scorched.

Example 5

A cookie dough of 3 mm thick was prepared and cut into a floral shape by a cookie cutter to obtain cookie pieces (each 2 g). Milk chocolate MSNYT (manufactured by Fuji Oil Company, Ltd.) (3.5 g) was squeezed on the cookie piece. At this time, viscosity or melted chocolate MSNYT was 250 poise/45° C. (product temperature) . The resultant material was baked in an oven with the upper flame at 180° C. and the lower flame at 160° C. for 12 minutes. Thus, baked chocolate stable to heat was obtained like Example 1. The moisture content of the cookie dough before baking was 15% and that after baking was 3%. Heat stability of the baked chocolate was in such a degree that, even when it was allowed to stand in an incubator at 37° C. for 6 hours, no softening and melting of the surface of chocolate were observed and chocolate did not stick to hands and fingers.

Comparative Example 3

A portion of milk chocolate MSNYT (manufactured by Fuji Oil Company, Ltd.) (3.5 g) was squeezed on a paper sheet. The resultant material was baked in an over with the upper flame at 180° C. and the lower flame at 160° C. for 12 minutes. Since baking was carried out without laying a cookie, the chocolate had no heat stability and shape retention. Then, the chocolate was melted and flattened out and also was scorched.

Example 6

Raw almond nut particles (size: about 3 mm×2 mm×2 mm) were spread and milk chocolate MSNYT (manufactured by Fuji Oil Company, Ltd.) was squeezed thereon. The mold of squeezer was in the shape of a rod or a semi-circle. The moisture content of raw almond before baking was 4%. The resultant material was baked in an oven with the upper flame at 170° C. and the lower flame at 160° C. for 10 minutes. Thus, baked chocolate confectionery stable to heat was obtained like Example 2. Its heat stability was in such a degree that, even when it was allowed to stand in an incubator at 37° C. for 6 hours, no softening and melting of the surface of chocolate were observed and chocolate did not stick to hands and fingers.

Example 7

White chocolate of quasi-chocolate grade having a fat content of 33% was prepared. Its main fat ingredient was rice bran/palm fractionated fats and oils containing 1% of α-starch ("Milagel 463" manufactured by Steelee) and 1% of dried egg white powder ("Dried egg white W type" manufactured by Kewpie). Viscosity of the resultant white chocolate was 270 poise/45° C. (product temperature). According to the same manner as in Example 2, cookie dough of 3 mm thick was prepared and cut into a floral shape by a cookie cutter to obtain cookie pieces (each 2 g). A portion (3.5 g) of the white chocolate was squeezed on the cookie piece and baking was carried out according to the same manner as in Example 2. Although the resultant chocolate confectionery was somewhat caramelized, it had heat stability and shape retention. Its heat stability was in such a degree that, even when it was allowed to stand in an incubator at 37° C. for 6 hours, no softening and melting of the surface of chocolate were observed and chocolate did not stick to hands and fingers.

Comparative Example 4

Milk chocolate of quasi-chocolate grade having a fat content of 55% was prepared. Its main fat ingredient was rice bran/palm fractionated fats and oils containing 1% of α-starch ("Milagel 463" manufactured by Steelee) and 1% of dried egg white powder ("Dried egg white W type" manufactured by Kewpie). Viscosity of the resultant white chocolate was 20 poise/45° C. (product temperature). According to the same manner as in Example 2, cookie dough of 3 mm thick was prepared and cut into a floral shape by a cookie cutter to obtain cookie pieces (each 2 g). A portion (2 g) of the above milk chocolate was squeezed on the cookie piece and baking was carried out according to the same manner as in Example 2. Since viscosity of the chocolate was low, the chocolate did not have shape retention and flowed out.

Comparative Example 5

Milk chocolate of chocolate grade having a fat content of 33% was prepared. Its main fat ingredient was cocoa butter containing 1% of α-starch ("Milagel 463" manufactured by Steelee) and 1% of dried egg white powder ("Dried egg white W type" manufactured by Kewpie). Viscosity of the resultant white chocolate was 260 poise/45° C. (product temperature). According to the same manner as in Example 2, cookie dough of 3 mm thick was prepared and cut into a floral shape by a cookie cutter to obtain cookie pieces (each 2 g). A portion (3.5 g) of the refined paste of the above milk chocolate which had been subjected to tempering was squeezed on the cookie piece and baking was carried out according to the same manner as in Example 2. Although the resultant chocolate confectionery had shape retention, it was caused fat bloom during and lost commercial value.

INDUSTRIAL APPLICABILITY

According to the present invention, it is possible to provide a process for producing confectionery highly stable to heat which can be eaten without being deformed, becoming sticky at the surface or sticking to each other while maintaining the original mouthfeel of chocolate.

What is claimed is:

1. A process for producing confectionery which comprises making the surface of a refined chocolate paste which adheres to or covers the surface of a bakery product absorb moisture by spraying moisture on or to the refined chocolate paste, or placing the refined chocolate paste in a steamer, and then baking at 110 to 250° C. so that only the surface of the chocolate is solidified to form a thin skin or film to obtain the confectionery, wherein the chocolate adheres to or covers the surface of the confectionery.

2. The process according to claim 1, wherein the chocolate comprises a fat ingredient and a saccharide ingredient.

3. A method of improving heat stability of a confectionery which comprises making the surface of a refined chocolate paste which adheres to or covers the surface of a bakery product absorb moisture by spraying moisture on or to the refined chocolate paste, or placing the refined chocolate paste in a steamer, and then baking at 110 to 250° C. so that only the surface of the chocolate is solidified to form a thin skin or film to obtain the confectionery, wherein the chocolate adheres to or covers the surface of the confectionery.

4. The method according to claim 3, wherein the chocolate comprises a fat ingredient and a saccharide ingredient.

* * * * *